United States Patent [19]

Tieckelmann et al.

[11] Patent Number: 4,721,659
[45] Date of Patent: Jan. 26, 1988

[54] PROCESS FOR APPLYING A CEMENTITIOUS MATERIAL TO A STRUCTURAL BASE AND ARTICLE PRODUCED THEREFROM

[75] Inventors: Robert H. Tieckelmann, Ossining; Fawzy G. Sherif, Stony Point, both of N.Y.

[73] Assignee: Stauffer Chemical Company, Westport, Conn.

[21] Appl. No.: 796,686

[22] Filed: Nov. 12, 1985

[51] Int. Cl.$^4$ ............................................. C04B 29/02
[52] U.S. Cl. ..................................... 428/701; 428/702; 427/403
[58] Field of Search ............... 428/698, 699, 701, 702; 427/403, 397.7

[56] References Cited

U.S. PATENT DOCUMENTS

| | | | |
|---|---|---|---|
| 2,200,433 | 5/1940 | Ripley | 94/24 |
| 2,760,885 | 8/1956 | Larson et al. | 117/70 |
| 2,954,301 | 9/1960 | Szukiewicz | 117/2 |
| 2,976,173 | 3/1961 | Czerwin et al. | 117/70 |
| 3,984,269 | 10/1976 | Schneller et al. | 156/71 |
| 4,367,247 | 1/1983 | Akerberg | 427/302 |

FOREIGN PATENT DOCUMENTS

| | | | |
|---|---|---|---|
| 1054322 | 11/1983 | U.S.S.R. | 428/701 |
| 1058929 | 12/1983 | U.S.S.R. | 428/701 |

OTHER PUBLICATIONS

Surface Preparation of Concrete for Paints and Coating, Robert W. Gaul, Concrete Construction Magazine, 5/81, 401–405.
NECO–CRETE 360–MPC Quick Setting Concrete Bag Panel.
SET–45 Chemical Action Concrete Handout.

*Primary Examiner*—Nancy Swisher
*Attorney, Agent, or Firm*—Hensley M. Flash

[57] ABSTRACT

A process for applying an aqueous mixture of a magnesium phosphate cementitious material to a base material in which the resulting bond between the materials is improved. In this method the base material is coated with a passivating agent capable of reducing the pH of the surface of the base material prior to applying the aqueous mixture of magnesium phosphate cementitious material. The base material can be a hydraulic cementitious material, e.g., Portland cement. The cementitious material is magnesium phosphate quick-setting cement. Preferred passivating agents can be aluminum acid phosphate, magnesium acid phosphate, aluminum sulfate, ammonium polyphosphate, phosphoric acid, an activator and mixtures thereof. The resulting laminated structure composed of the base material, the coating and the magnesium phosphate cementitious material is also disclosed.

18 Claims, No Drawings

PROCESS FOR APPLYING A CEMENTITIOUS MATERIAL TO A STRUCTURAL BASE AND ARTICLE PRODUCED THEREFROM

BACKGROUND OF THE INVENTION

1. Field of the Invention

This invention relates to a process for bonding magnesium phosphate cementitious materials to base materials and is more particularly concerned with the process for improving the bond between such materials by precoating the surface of the base material with a passivating agent, and with the resulting laminated structures.

2. Related Information

The problem of applying cementitious material as an overlay to various base materials e.g., monolithic concrete and the like, is a difficult one, and none of the solutions heretofore suggested have been entirely satisfactory. It is well known, for example, that one cannot successfully apply an overlay, a coating or layer of a cementitious material to a set concrete base because the overlay or finishing coat cracks and does not form a firm permanent bond between the concrete base and the applied overlay or coating. This problem is compounded when the cementitious material is appreciably different, e.g., chemically, from the base material. Thus, the problem of developing a process for satisfactorily applying cementitious materials to base structural materials is a very real one in this art.

The method most commonly used heretofore is that of applying an adhesive coating to the base material or substrate, which coating is in the nature of an asphalt emulsion. Over this adhesive coating is applied the cementitious material. It is necessary to apply the cementitious material immediately after application of the adhesive coating, since the action depends on the tack qualities of the adhesive. In the course of time, such finish coatings applied according to that process crack and craze because of the deterioration of the underlined film of asphalt, a material notoriously susceptible to oxidation, temperature changes and internal breakdown of the constituents thereof.

U.S. Pat. No. 2,200,433 (Ripley, May 14, 1940) discloses methods of resurfacing concrete roadways. In this process the roadway is first treated with a relatively concentrated solution of caustic alkali which serves to facilitate suponification and removal of any organic film. The alkali is next removed, for example, by sweeping the road surface, and hydrochloric acid is sprayed or otherwise applied to the road surface. Other acids can replace hydrochloric acid, such as sulfuric or the like, but hydrochloric acid is preferred. Next, a thin layer of sodium orthoborate is applied to the road surface prior to the application of a mixture of cement and water or a mixture of sand, cement and water as a dressing surface. The layer of sodium orthoborate/acid mixture on the road surface will facilitate bonding of the dressing layer with the concrete road surface. This reference neither discloses the various passivating agents useful in this invention nor the use of a magnesium phosphate cementitious material. It is also noted that borates are not effective passivating agents in the process of this invention.

U.S. Pat. No. 2,954,301 (Szukiewicz, Sept. 27, 1960) discloses a process for bonding freshly applied hydraulic cement materials, e.g., Portland cement, magnesium aluminate cement, so-called magnesium oxychloride cement, concrete made from such cements, and plasters of Paris to surfaces of a similar character. This process comprises coating the old cement surface with a mixture containing an adduct prepared by reacting a polyol with an organic polyisocyanate and a resin-forming catalyst, curing the resulting coating by exposure to the atmosphere until the coating becomes dry and tacky, applying fresh water-containing hydraulic cement material to the dry and tacky coating and permitting the water-containing hydraulic material to form a strong bond with the old cement surface. This reference does not disclose the passivating agents useful in the present invention.

U.S. Pat. No. 3,984,269 (Schneller et al., Oct. 5, 1976) discloses a process for accelerating the set of a settable dry wall joint compound by the use of a layer of set accelerator beneath and on top of each coat of settable compound. The set accelerator is a spray application of a thin coat of aluminum sulfate. The joint compound comprises a settable calcined gypsum binder. Set accelerators can also include the sulfate of calcium, magnesium, potassium, cadmium, copper, sodium, iron, chromium and ammonium, potassium aluminum sulfate, sodium hydrogen sulfate, zinc acetate, potassium bichromate, ferric chloride, sulfuric acid and oxalic acid. These other accelerators provide a lesser degree of function than the preferred aluminum sulfate. This reference neither discloses the variety of passivating agents nor the cementitious and base materials contemplated by this invention.

U.S. Pat. No. 4,367,247 (Akerberg, Jan. 4, 1983) discloses a primer composition for Portland cement concrete comprising the reaction product of polyphosphoric acid and an alcohol. This primer composition improved the bonding between Portland cement concrete and the resinous coating materials used to protect the surface of the cement. The cementitious material overlying the base material of this invention does not include the resinous coating, e.g. furan resins, contemplated by this reference.

*Surface Preparation of Concrete for Paints and Coating* by Robert W. Gaul, reprinted from Concrete Construction Magazine, World of Concrete Center, 426 S. Westgate, Addison, Ill. disclosed that although acid etching has been widely used to remove laitance or dirt from concrete, it is not a preferred method because it is difficult to control, especially in assuring that all of the acid and residue are cleaned from the surface. A 10% solution of hydrochloric acid or a 15% solution of phosphoric acid can be used to acid etch. After the surface is acid etched, it is throughly flushed with water, scrubbed with stiff brooms, and then allowed to dry before a coating is applied. The coatings applied, usually paints, can be to decorate the surface, to dampproof, to waterproof or otherwise to protect the Portland cement concrete surface. This reference neither discloses the passivating agents nor the cementitious material of this invention.

U.S. Pat. No. 2,976,173 (Czerwin et al., March 21, 1961) discloses a processes for improving the bond between concrete, plaster or the like to surfaces of concrete or other hydraulic material by precoating the surface of the base material with polyvinyl alcohol. This reference does not disclose the use of the passivating agents of this invention.

U.S. Pat. No. 2,760,885 (Larsen et al., Aug. 28, 1956) discloses a process for bonding hydraulic cementitious materials. In this process the base material is coated with a film of aqueous emulsion of a resin, the deposited solids of which will reemulsify on contact with water. The coating resin can be polyvinyl acetate alone or in combination with either xylene glycol alone or in combination with tricresyl phosphate. This reference does not discloses the passivating agent of this invention.

SUMMARY OF THE INVENTION

An object of this invention is to provide a process for improving the bond between a magnesium phosphate cementitious material and a base material wherein the base material is also a cementitious concrete material of either the same or different character of the overlying cementitious magnesium phosphate material.

Other objects and advantages of the present invention are described elsewhere within the specification.

In a process for applying an aqueous mixture of a magnesium phosphate cementitious material to a base material, this invention is a method of improving the bond between said materials which comprises coating the base material with a passivating agent capable of reducing the pH of the surface of the base material prior to applying the aqueous mixture of magnesium phosphate cementitious material. In this process, the base material can be a hydraulic cementitious material e.g., Portland cement. Preferred passivating agents are selected from the group consisting of aluminum acid phosphate, magnesium acid phosphate, aluminum sulfate, ammonium polyphosphate, phosphoric acid, an activator and mixtures thereof. The cementitious material is a magnesium phosphate quick-setting cement.

This invention also discloses a laminated structure having improved internal bond strength comprising a base material, a coating thereon of a passivating agent capable of reducing the pH of the surface of the base material, and a magnesium phosphate cementitious material overlying and adhering to the coating. In this laminated structure the base material, the magnesium phosphate cementitious material and the passivating agent can be as defined above.

DETAILED DESCRIPTION OF THE INVENTION

The present invention is directed to a process for improving the bond between a magnesium phosphate cementitious material and a base material through the intermediary of a passivating agent. This method comprises coating the base material with a passivating agent capable of reducing the pH of the surface of the base material prior to applying the overlying coat of the aqueous mixture of magnesium phosphate cementitious material.

The base material is a solid base structure such as, for example, concrete block, and monolithic concrete slabs. A preferred base material is hydraulic cementitious material and a more preferred base material is Portland cement concrete.

The cementitious material that is applied onto the set concrete base material of this invention is magnesium phosphate quick-setting cements. Of these magnesium phosphate cements, a preferred one comprises: a) solid activator; b) a magnesium-containing component; and c) an optional aggregate.

In this preferred magnesium phosphate cementitious material, the solid activator component is a composite comprising a $P_2O_5$ material absorbed onto a porous material. This activator can be prepared by mixing a porous material with a liquid phosphorous pentoxide material then heating the mixture until a dry solid is produced. The dry solid is then milled.

The term "$P_2O_5$ material" is used throughout this specification to describe material containing phosphorus values. The phosphorus content of these materials is usually analyzed and expressed as $P_2O_5$, hence the term "$P_2O_5$ material".

The liquid phosphorus pentoxide material can be any material containing free or available $P_2O_5$ such as green acid. This material can be selected from various industrial and agricultural chemicals and wastes. Some examples of suitable $P_2O_5$ materials include aluminum phosphate solution; ammonium phosphate solution; calcium phosphate solution; bright dip phosphoric acid from metal polishing processes; phosphoric acid; waste phosphoric acid from agricultural chemical processes; steel phosphatizing sludge acid resulting from the pickling of steel to inhibit corrosion; arsenic sulfide sludge acid resulting from the treatment of $P_2O_5$ waste streams with $H_2S$ to remove arsenic; and any combination of the above liquids.

The liquid $P_2O_5$ material can further include various acidic phosphorus compounds, e.g., orthophosphoric acid, pyrophosphoric acids and other polyphosphoric acids and their salts.

A preferred liquid $P_2O_5$ material is ammonium phosphate fertilizer solution. This fertilizer solution contains a mixture of ortho- and polyphosphates and in its original aqueous state undergoes continuous hydrolysis while standing whereby the weight ratios of the different phosphate forms keep changing, usually from high polyphosphate and low orthophosphate contents to low polyphosphate and high orthophosphate contents as the fertilizer ages. The polyphosphates of this fertilizer solution can include pyro-, tri-, tetra-, etc., phosphate species. Because of this continuous hydrolysis, magnesium phosphate cements using liquid ammonium phosphate fertilizer by itself as the $P_2O_5$ component exhibit unpredictable qualities. Usually, when a fresh fertilizer solution is used, the cement mixture does not set at all or only forms a weak cement, and when an older fertilizer solution is used, the cement sets very rapidly with little or no working time to apply the cement. Liquid fertilizer solution, upon standing, precipitates hard to handle insolubles, and in cold weather the liquid freezes and gels creating more handling problems.

A particularly preferred fertilizer solution is Poly-N ® 10-34-0 ammonium polyphosphate solution supplied by Arcadian Chemical Company and used primarily as an agricultural fertilizer. A typical analysis of the Poly-N ® brand fertilizer shows 10 weight percent ammoniacal nitrogen and 34 weight percent total $P_2O_5$. Sixty percent of the total $P_2O_5$ is polyphosphate. The commercial product contains approximately 2 weight percent of impurities, which do not adversely effect its use in preparing the solid activator. The major impurities comprise approximately 0.5 weight percent iron, 0.5 weight percent sulfur, 0.2 weight percent magnesium (as MgO) and 0.15 weight percent of fluorine. This commercial product also contains approximately 50 weight percent water.

A particularly preferred liquid $P_2O_5$ material is Poly-N ® 10-34-0 ammonium polyphosphate solution which has been pre-treated by adding orthophosphoric acid thereto up to about 50 weight percent of the fertilizer solution.

When the fertilizer solution is absorbed onto the porous material, the fertilizer is held in a bound form and this composition is much more thermally stable in a temperature range of from ambient to about 120° C., than the original fertilizer solution. The resulting dry solid maintains a constant phosphate distribution between the ortho- and polyphosphate species and does not hydrolyze as the original fertilizer solution would.

The porous material which can be employed in this preferred cementitious material includes diatomaceous earth, kieselguhr, artificially prepared porous silica, vermiculite, alumina, and such naturally occurring substances as various fuller's earth and clays such as bentonite, montmorillonite, acid treated clays and the like. Each porous material which may be used will exert its own specific influence upon the solid activator formed and the resulting fast-setting cement which will not necessarily be identical with that of other members of the class. The porous material can be inert or partially inert. Members of the class of porous material can be used separately or in combination with each other.

A preferred porous material is diatomaceous earth. The highly porous diatomaceous earth can absorb much more than 80 percent by weight, based on the weight of diatomaceous earth, of a phosphate-containing liquid, e.g. liquid ammonium phosphate fertilizer solution, and absorption of 225 percent and above are preferred. Upon drying the diatomaceous earth with the phosphate-containing liquid absorbed therein, the solid $P_2O_5$ activator forms.

The diatomaceous earth can comprise from about 30 percent to about 90 percent by weight of the solid activator with about 30 percent to about 65 percent being preferred; can have a density of from 7.0 to 19.5 pounds/cubic foot (0.112 to 0.312 gms/cc); can have a water absorption value of from 170 percent to 255 percent by weight; and can have a surface area of from 1 to 100$M^2$/g. It is believed that when diatomaceous earth is mixed with liquid ammonium phosphate fertilizer and heated to form the dry solid activator, more than a physical entrapment of the $P_2O_5$ material occurs.

The liquid $P_2O_5$ material is mixed with the porous material at ambient temperature to form a semi-solid, slurry or paste. The amount of liquid $P_2O_5$ material added is important. Amounts up to that which will fill the pores of the porous material can be used with one drying step. Amounts exceeding the pore volume of the porous material can be absorbed with several drying steps. The semi-solid, slurry or paste is heated to a temperature of from about 60° C. to about 200° C. to drive off moisture and other volatile impurities until a dry solid is produced.

The rate of heating is adjusted so that, upon drying, the pores of the porous material are not blocked with the $P_2O_5$ material, but remain available to the aqueous component when the cement is made. Sufficient porous material should be used to have enough pore volume available to absorb a suitable amount of the $P_2O_5$ material. Upon drying, most of the aqueous component will be driven off, leaving solid $P_2O_5$ material deposited inside and over the walls of the microscopic pores.

The starting materials, i.e. the liquid $P_2O_5$ material, and the porous material are mixed in a preferred embodiment in the proportions necessary to form a dry solid comprising from about 10 percent to about 70 percent by weight of the $P_2O_5$ material and from about 30 percent to about 90 percent by weight of the porous material in the resulting solid activator.

The solid activator prepared as described above is dry blended with a magnesium-containing component to yield a dry cementitious composition capable of setting to a hardened mass at ambient temperatures when reacted with an aqueous component. The solid activator can optionally be milled and classified prior to being dry blended with the other components of the cementitious composition. The activator typically has a particle size range of from 100 to 325 mesh and a surface area of from 0.1 to 10 $M^2$/g.

The solid activator can range from about 6 weight percent to about 90 weight percent of the cementitious composition, with a range from about 10 weight percent to about 25 weight percent being preferred.

The magnesium-containing component can be any material capable of releasing magnesium ions, making said ions available to react to form a magnesium phosphate concrete. Preferred magnesium-containing compounds are magnesium oxide, magnesium hydroxide and magnesium carbonate. These compounds must be capable of being dry blended with the solid activator without reacting therewith. However, in the presence of an aqueous component the dry blend will react to form a monolithic solid. Mixtures of these magnesium compounds can also be employed.

A preferred magnesium-containing component is MgO. This MgO can be of low reactivity, of high reactivity or a mixture of low and high reactivity, wherein the ratio of the constituents of the mixture is selected to achieve the working time and cement strength desired. This preferred magnesium-containing component can usually be from about 4 percent to about 50 percent by weight of the overall composition, with from about 5 to about 15 percent by weight being preferred.

The optional particulate aggregate used in the preferred magnesium phosphate cementitious material of this invention is preferably graded sand and can be included in the cementitious mixture in a controlled amount as a filler. Aggregate can greatly enhance the strength of the hardened concrete cement. Aggregate usage can range from 0 percent to 90 percent by weight of the dry mix containing aggregate with a range of from about 40 percent to about 80 percent by weight of the dry mix plus aggregate being preferred. Other aggregate materials which can be used include particles of competent rocks or rock-forming minerals such as granite, basalt, dolomite, andesite, feldspar, amphibole, pyroxene, olivine, gabbro, rhyolite, syenite, diorite, dolerite, peridotite, trachyte, obsidian, quartz, etc., as well as materials such as slag, cinders, fly ash, glass cullet, wood chips, and fibrous materials such as chopped metal wire (preferably steel), glass fibers, asbestos, cotton, and polyester and aramide fibers. Aggregates having different particle shapes and sizes can be used. Mixtures of different aggregates can also be used. The porous material used to absorb the liquid $P_2O_5$ material can further function as an aggregate.

The dry blend of the preferred magnesium phosphate cementitious material remains a free-flowing powder until it is contacted with an aqueous component, preferably water, then a reaction occurs forming a fast-setting cement. The amount of aqueous component used is important. Too much water can convert the dry blend into a thin slurry that will not set until substantial dehydration occurs; and, too little water will not wet the dry blend sufficiently to allow the necessary chemical reaction. The optimum amount of water will depend upon the particular physical characteristics of the constituents of the dry blend, e.g., absorbency, surface area, etc. However, the optimum amount of water must be sufficient to adequately wet the dry blend and optional aggregate mixture to form a thick slurry or non-collapsible putty. This optimum amount of water can be determined on a blend by blend basis. The amount of water used can range from about 5 weight percent to about 15 weight percent of the overall composition with from about 8 to about 12 weight percent being preferred.

Generally, the setting time for fast-setting magnesium phosphate cements varies widely and can range from a few seconds up to a few hours. As a practical matter, the setting time must be sufficient to allow the dry blend to be thoroughly mixed with the aqueous component to form a slurry or a non-collapsible putty and be applied to the intended area, whether a mold or a patch, prior to hardening into a monolithic solid. In quantitative terms, fast-setting usually means that the cement hardens in less than 30 minutes, usually in about 1 to 15 minutes, and reaches more than 1,500 psi compressive strength in usually less than 2 hours.

In a particular embodiment of the preferred fast-setting magnesium phosphate cementitious material used in the process of this invention, the solid activator is prepared by mixing diatomaceous earth with liquid ammonium phosphate fertilizer and orthophosphoric acid to form a semi-solid, drying the semi-solid and milling the dried semi-solid; the magnesium-containing component is a mixture of active and dead burned magnesium oxide; and the aggregate is graded silica.

The passivating agent used in this invention is a material that, when applied to the surface of the base material, improves the resulting bond between the treated surface of the base material and the applied cementitious material. The passivating agent reduces the pH of the surface of the base material, and passivates the surface of the base material especially to reactions that are deleterious to the forming of a bond between the cementitious material to be applied to the surface of the base material. These passivating agents do more than clean the surface of the base material. They actually promote and enhance the bonding between the passivated surface and the cementitious materials. Prior art acid treatments merely clean the surface of the base material and remove laitance, i.e. the layer of high-water-cement-ratio gel which comes to the surface of a pour.

A proposed mechanism for this invention follows. However, this mechanism is only presented as an aid in the discussion of this invention and it is not intended that the invention be limited thereby. This proposed mechanism involves the chemical reaction of the passivating agent at the interface with the base material to form a reaction product than can cross-link with the overlying magnesium phosphate cement. For example, aluminum acid phosphate can react with calcium carbonate and calcium oxide and hydroxide in Portland cement to form a calcium acid aluminum phosphate with the liberation of carbon dioxide and water. The evolution of gaseous carbon dioxide can usually be observed upon application of the passivating agent. The calcium acid aluminum phosphate formed can cross-link with the overlaying magnesium phosphate to form a strong chemical bond of magnesium acid aluminum phosphate. It is the chemical bond that can form in this proposed mechanism that is through to be responsible for the improved bond strength demonstrated by this invention.

The passivating agents useful in this invention include one or more of the following: Periodic Table (appearing in *The Condensed Chemical Dictionary*, ninth edition, Van Nostrand Reinhold Co. 1977) Groups IA, IIA and IIIA acid phosphates and sulfates, excluding those of boron in Group IIIA; ammonium phosphates and sulfates; and phosphoric acids including ortho-, poly- and mixtures thereof. Preferred passivating agents include aluminum acid phosphate, magnesium acid phosphate, ammonium polyphosphate and orthophosphoric acid. Note that the ammonium phosphates listed above includes ortho-, poly- and mixtures thereof. A particularly preferred passivating agent is orthophosphoric acid having a concentration of from about 10 to about 25 weight percent. Another particularly preferred passivating agent is an activator prefered as described elsewhere in this application. Further particularly preferred passivating agents include Poly-N ® brand ammonium phosphate fertilizer solution, type 10-34-0 (sold by Arcadian Chemical Company) alone or in combination with 15 weight percent $H_3PO_4$.

Preferred passivating agents useful in this invention are selected from the group consisting of aluminum acid phosphate, magnesium acid phosphate, aluminum sulfate, ammonium polyphosphate, phosphoric acid, an activator and mixtures thereof. The activator is prepared as described above.

The passivating agent can be applied in a variety of ways to the base material, e.g., as a solution, as a paste or as a light dusting of power onto a dampened surface. The preferred amount of passivating agent should be sufficient to cover the surface to be treated with a thin film. Any excess material is preferably removed prior to the application of the cementitious material by, e.g., wiping with a cloth, or brushing or by use of an air hose. The surface of the base material can be mechanically cleaned, e.g. sand-blasting or brushing with a wire brush, prior to the application of the passivating agent to ensure that no loose or foreign materials remain deposited thereon.

It is noted that borates and sufluric and hydrochloric acids do not work in the process of this invention. Chlorides appear to inhibit bond formation and promote corrosion of underlying reinforcing steel that can be present in the base material.

This invention also includes the various laminated structures resulting from the processes described above.

In a particular embodiment of this invention, the preferred magnesium phosphate cementitious material is applied to the surface of a Portland cement base material that was previously coated with an aluminum acid phosphate passivating agent. After setting, the resulting laminates exhibit increased bonding strength at the interface of cementitious material and Portland cement over laminates that were not previously coated with one of the passivating agents of this invention.

The following experiments describe various embodiments of the invention. Other embodiments will be apparent to one of ordinary skill in the art from a consideration of this specification or practice of the invention disclosed therein. It is intended that the specification and experiments be considered as exemplary only, with the true scope and spirit of the invention being indicated by the claims which follow the experiments.

EXPERIMENTS 1–10

Various solutions of passivating agents and certain control solutions were applied to the surface of Portland cement concrete. After a few minutes, a quick-setting magnesium phosphate cement was poured over the surface of the Portland cement concrete and allowed to set.

The Portland cement concrete surfaces used were saw cut 2" width ×2" height ×4" length (5 cm ×5 cm × 10 cm) Portland cement concrete solids aged more than 28 days. A solution of the passivating agent or the control solution was brushed onto a fresh surface of the Portland cement concrete solid at a usage level of about 1 ml/sq. inch (0.2 ml/sq. cm). Any excess solution was wiped from the surface.

The Portland cement concrete solid was then placed into a mold of dimensions 2" width ×4" height ×4" length (5 cm. × 10 cm × 10 cm) with the treated surface uppermost. A slurry of quick-setting magnesium phosphate cement was applied over the treated Portland cement concrete surface. This composite was allowed to cure for 24 hours.

After curing, the composite was released from the mold and sawed into two 2"4" high ×2" long (5 cm ×10 cm ×5 cm) solids, each having a layer of quick-setting magnesium phosphate cement concrete and a layer of Portland cement concrete. Instron attachments were affixed by epoxy to opposite faces of the solid i.e. one attachment to a Portland cement concrete face and the other attachment to the opposite quick-setting magnesium phosphate cement concrete face, then the tensive strength of the bond was measured.

The quick-setting magnesium phosphate cement used was FS-CEMENT(TM) brand supplied by Stauffer Chemical Company. This cement is typically prepared as follows. The activator is prepared first by mixing 630 grams of Poly-N ® 10-34-0 brand ammonium phosphate fertilizer solution (sold by Arcadian Chemical Company), 270 grams of orthophosphoric acid and 400 grams of diatomaceous earth Standard Super Cel grade (Manville Corporation) then treating the mixture by heating at 120° C. for 16 hours. The resulting dry solid activator is milled to allow 60 weight percent to pass through 200 mesh.

262 grams of activator prepared as above is dry blended with 14 grams of active $M_gO$, 128 grams of dead burned MgO, 20 grams of diammonium phosphate and 2.7 grams of $Fe_3O_4$ to yield 426.7 grams of a binder. 1280 grams of aggregates consisting of 640 grams of coarse and 640 grams of fine aggregates is added to the 426.7 grams of binder.

Water is added to this dry binder/aggregates composition, typically from 5 to 12 parts of water per 100 parts of dry mix. The resulting slurry will solidify in a few minutes to form a quick-setting magnesium phosphate cement concrete.

The results of these experiments are listed in the following Table I.

TABLE I

MAGNESIUM PHOSPHATE CEMENT[1] OVERLAYS ON PORTLAND CEMENT SUBSTRATES

| Run No. | Passivating Agent | Tension PSI | Strength $N/mm^2$ | Elapsed Time Days |
|---|---|---|---|---|
| 1 | None (Control) | 0 | 0 | 1 |
| 2 | 85% $H_3PO_4$ | 0 | 0 | 1 |
| 3 | 6.3% Boric Acid | 0 | 0 | 1 |
| 4 | Urea in Phosphoric Acid Solution[2] | 22 | 0.15 | 1 |
| 5a | $Al(H_2PO_4)_3$[3] | 73 | 0.5 | 1 |
| 5b | $Al(H_2PO_4)_3$[3] | 89 | 0.6 | 24 |
| 6a | $Mg(H_2PO_4)_2$[4] | 73 | 0.5 | 1 |
| 6b | $Mg(H_2PO_4)_2$[4] | 145 | 1.0 | 24 |
| 7 | $Al_2(SO_4)_3$[5] | 73 | 0.5 | 9 |
| 8 | Activator Slurry[6] | 265 | 1.8 | 35 |

TABLE I-continued

MAGNESIUM PHOSPHATE CEMENT[1] OVERLAYS ON PORTLAND CEMENT SUBSTRATES

| Run No. | Passivating Agent | Tension PSI | Strength $N/mm^2$ | Elapsed Time Days |
|---|---|---|---|---|
| 9 | Ammonium Phosphate Solution[7] | 254 | 1.75 | 35 |
| 10 | 15% $H_3PO_4$ | 290 | 2.0 | 19 |

[1]FS-CEMENT ™ brand of quick-setting cements supplied by Stauffer Chemical Company.
[2]40 g urea in 150 mls 85% $H_3PO_4$.
[3]50% aqueous solution.
[4]52 g 85% $H_3PO_4$, 12 g $Mg(OH)_2$ and 36 g $H_2O$.
[5]87 g $Al_2(SO_4)_3$ 18 $H_2O$ and 100 g $H_2O$.
[6]70 g Activator and 50 mls water. Activator prepared by procedure outlined above.
[7]10% ammoniacal nitrogen, 34% $P_2O_5$, 0% $K_2O$.

In Table I, Run No. 10 was conducted according to the following procedure. A 15 weight percent $H_3PO_4$ solution was brushed over a Portland cement concrete surface and left for 5 minutes. After the gas evolution subsided, the surface was washed with water. Quick-setting magnesium phosphate cement slurry was applied to the surface and left to harden for two hours. The bond between the quick-setting cement and the Portland cement was intact and the tension strength was measured as reported in Table I above. No gas bubbles were observed at the interface. The overlay was 1½" high over 1½ Portland Cement (3.8 cm ×3.8 cm).

In Table I, Run No. 8 was carried out according to the following procedure. A slurry of activator (prepared by the procedure outlined above) and water was applied with a spatula or a trowel to a cured and aged Portland cement concrete surface. It was important to apply only a very thin coating because evolved gases (acid/base reaction) must diffuse through this coating. The coating was allowed to dry. After drying the coating was dampened, then the magnesium phosphate cement was poured over the coated surface and left to set. A good bond was formed between the magnesium phosphate cement and the Portland cement (see Table I for data).

In Table I, Run No. 9 was carried out according to the following procedure. A solution of Poly-N ® brand of ammonium polyphosphate fertilizer solution type 10-34-0, supplied by Arcadian Chemical Company was applied to a cured and aged Portland cement concrete surface. After several minutes, all excess material was wiped off the coated surface. The treated surface must remain damp hence a small amount of water can be added if the surface dries out. Quick-setting magnesium phosphate cement is then poured onto the damp surface and allowed to reach final cure (24 hours). A good bond was formed between the magnesium phosphate cement and the Portland cement (see Table I for data).

The data in the following Table II demonstrates the utility of the present invention using various types of quick-setting magnesium phosphate cement.

In Runs No. 4 and 5 the Bostik ® brand of quick-setting magnesium phosphate cement used was a two component system. One component was an ammonium polyphosphate fertilizer solution and the other component was a magnesium-containing powder. The mixing of the two components formed a magnesium phosphate cementitious slurry. This slurry wet the surface of the Portland cement concrete substrate with ammonium polyphosphate, a passivating agent of this invention. Hence, In Run No. 4, the Portland cement concrete surface was inherently treated with a passivating agent, even though it was not added passivating agent. This explains the good bonding strength observed in Run No. 4.

TABLE II

MAGNESIUM AMMONIUM PHOSPHATE CEMENT OVERLAYS ON PORTLAND CEMENT CONCRETE SUBSTRATES

| Run No. | Cement Type | Passivating Agent | Tension PSI | Strength N/mm$^2$ | Elapsed Time Days |
|---|---|---|---|---|---|
| 1 | SET-45 ®[5] | None | 0 | 0 | 1 |
| 2 | " | Al(H$_2$PO$_4$)$_3$[1] | 267 | 1.84 | 44 |
| 3 | " | Mg(H$_2$PO$_4$)$_2$[2] | 321 | 2.21 | 44 |
| 4 | BOSTIK ®[6] | None | 343 | 2.37 | 56 |
| 5 | " | Mg(H$_2$PO$_4$)$_2$[2] | 258 | 1.78 | 56 |
| 6 | FS-CEMENT TM[7] | None | 0 | 0 | 1 |
| 7 | FS-CEMENT TM[7] | Activator Slurry[3] | 265 | 1.8 | 35 |
| 8 | FS-CEMENT TM[7] | Ammonium Phosphate Solution[4] | 254 | 1.75 | 35 |

[1] 50% aqueous solution.
[2] 52 g 85% H$_3$PO$_4$, 12 g Mg(OH)$_2$, 36 g H$_2$O.
[3] 70 g Activator and 50 mls H$_2$O.
[4] 10% ammoniacal nitrogen, 34% P$_2$O$_5$, 0% K$_2$O.
[5] brand of quick-setting magnesium phosphate cement supplied by Master Builders.
[6] brand of quick-setting magnesium phosphate cement supplied by UPCO Div. Emhart Corp.
[7] brand of quick-setting magnesium phosphate cement supplied by Stauffer Chemical Company.

What is claimed is:

1. A laminated structure having improved internal bond strength comprising a base material, a coating thereon of a passivating agent capable of reducing the pH of the surface of the base material, and a magnesium phosphate cementitious material overlying and adhering to the coating.

2. The laminated structure of claim 1 wherein the base material is a hydraulic cementitious material.

3. The laminated structure of claim 1 wherein the base material is Portland cement.

4. The laminated structure of claim 3 wherein the passivating agent is a mixture of an ammonium phosphate fertilizer solution and orthophosphoric acid having a concentration from about 10 to about 25 weight percent.

5. The laminated structure of claim 1 wherein the passivating agent is one or more of the following agents selected from the group consisting of: Periodic Table Groups IA, IIA and IIIA acid phosphates and sulfates, excluding those of boron in Group IIIA; ammonium phosphates and sulfates; and phosphoric acids having a concentration from about 10 to about 25 weight percent including orthophosphoric acid, polyphosphoric acids and mixtures thereof.

6. The laminated structure of claim 1 wherein the passivating agent is selected from the group consisting of aluminum acid phosphate, magnesium acid phosphate, aluminum sulfate, ammonium polyphosphate, phosphoric acid having a concentration from about 10 to about 25 weight percent, an activator and mixtures thereof.

7. The laminated structure of claim 1 wherein the passivating agent is orthophosphoric acid having a concentration from about 10 to about 25 weight percent.

8. The laminated structure of claim 1 wherein the passivating agent is an ammonium phosphate fertilizer solution.

9. The laminated structure of claim 1 wherein the passivating agent is a mixture of an ammonium phosphate fertilizer solution and phosphoric acid having a concentration from about 10 to about 25 weight percent.

10. In a process for applying an aqueous mixture of a magnesium phosphate cementitious material to a base material, a method of improving the bond between said materials which comprises coating the base material with a passivating agent capable of reducing the pH of the surface of the base material prior to applying the aqueous mixture of magnesium phosphate cementitious material.

11. The process of claim 10 wherein the base material is a hydraulic cementitious material.

12. The process of claim 10 wherein the base material is Portland cement.

13. The process of claim 12 wherein the passivating agent is an ammonium phosphate fertilizer solution and orthophosphoric acid having a concentration from about 10 to about 25 weight percent.

14. The process of claim 10 wherein the passivating agent is one or more of the following agents selected from the group consisting of: Periodic Table Groups IA, IIA and IIIA acid phosphates and sulfates, excluding those of boron in Group IIIA; ammonium phosphates and sulfates; and phosphoric acids having a concentration from about 10 to about 25 weight percent including orthophosphoric acid, polyphosphoric acids and mixtures thereof.

15. The process of claim 10 wherein the passivating agent is selected from the group consisting of aluminum acid phosphate, magnesium acid phosphate, aluminum sulfate, ammonium polyphosphate, phosphoric acid having a concentration from about 10 to about 25 weight percent, an activator and mixtures thereof.

16. The process of claim 10 wherein the passivating agent is orthophosphoric acid having a concentration from about 10 to about 25 weight percent.

17. The process of claim 10 wherein the passivating agent is an ammonium phosphate fertilizer solution.

18. The process of claim 10 wherein the passivating agent is a mixture of an ammonium phosphate fertilizer solution and phosphoric acid having a concentration from about 10 to about 25 weight percent.

* * * * *